US012627609B2

(12) United States Patent
Meredith et al.

(10) Patent No.: US 12,627,609 B2
(45) Date of Patent: May 12, 2026

(54) CONTROLLING DATA RATE BASED ON DOMAIN AND RADIO USAGE HISTORY

(71) Applicant: AT&T Intellectual Property I, L.P., Atlanta, GA (US)

(72) Inventors: Sheldon Meredith, Roswell, GA (US); William Cottrill, Canton, GA (US); John Pastore, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/654,037

(22) Filed: May 3, 2024

(65) Prior Publication Data

US 2024/0283744 A1     Aug. 22, 2024

Related U.S. Application Data

(60) Continuation of application No. 17/807,879, filed on Jun. 21, 2022, now Pat. No. 12,010,032, which is a (Continued)

(51) Int. Cl.
| | |
|---|---|
| *H04L 47/25* | (2022.01) |
| *H04L 43/0852* | (2022.01) |
| *H04L 43/0876* | (2022.01) |
| *H04L 43/16* | (2022.01) |
| *H04L 47/32* | (2022.01) |
| *H04W 28/08* | (2023.01) |
| *H04W 28/086* | (2023.01) |
| *H04W 28/10* | (2009.01) |

(Continued)

(52) U.S. Cl.
CPC .......... *H04L 47/25* (2013.01); *H04L 43/0858* (2013.01); *H04L 43/0876* (2013.01); *H04W 28/086* (2023.05); *H04W 28/10* (2013.01); *H04L 43/16* (2013.01); *H04L 47/32* (2013.01); *H04W 28/08* (2013.01); *H04W 88/12* (2013.01); *H04W 88/16* (2013.01)

(58) Field of Classification Search
None
See application file for complete search history.

(56) References Cited

U.S. PATENT DOCUMENTS

| | | |
|---|---|---|
| 8,103,769 B1 | 1/2012 | Weiser et al. |
| 8,260,938 B2 | 9/2012 | Gupta et al. |

(Continued)

OTHER PUBLICATIONS

Final Office Action received for U.S. Appl. No. 15/435,921 dated Mar. 6, 2019, 25 pages.

(Continued)

*Primary Examiner* — Nicholas Sloms
(74) *Attorney, Agent, or Firm* — Guntin & Gust, PLC; Mark Wilinski

(57) ABSTRACT
A domain and a mobile device may exchange data via a radio access node included in a mobile network. During a time of peak demand, a data load level of the radio access node may exceed a threshold. To accommodate the peak demand, historical types and volumes of data may be used to manage a data rate related to data associated with the domain. Based on the historical information, the data rate for a mobile device, a radio access node, a range of time, or a data type may be controlled. The data rate may be managed by a network gateway, such as a gateway included in the mobile network.

18 Claims, 10 Drawing Sheets

Related U.S. Application Data continuation of application No. 16/842,971, filed on Apr. 8, 2020, now Pat. No. 11,398,986, which is a division of application No. 15/435,921, filed on Feb. 17, 2017, now Pat. No. 10,659,375.

(51) Int. Cl.
　　*H04W 88/12*　　(2009.01)
　　*H04W 88/16*　　(2009.01)

(56)　　　　　　References Cited

U.S. PATENT DOCUMENTS

| | | | |
|---|---|---|---|
| 8,385,199 B1 | 2/2013 | Coward et al. | |
| 8,457,652 B2 | 6/2013 | Liu et al. | |
| 8,874,073 B2 | 10/2014 | Mendiola | |
| 8,886,749 B2 | 11/2014 | Kim et al. | |
| 8,930,294 B2 | 1/2015 | Anandaraj | |
| 9,203,529 B2 | 12/2015 | Chen et al. | |
| 9,203,629 B2 | 12/2015 | Momtahan et al. | |
| 9,350,616 B1 | 5/2016 | Lou et al. | |
| 9,473,413 B1 | 10/2016 | Cao et al. | |
| 9,510,355 B2 | 11/2016 | Meredith et al. | |
| 2003/0198199 A1* | 10/2003 | Budka | H04W 72/21 |
| | | | 370/347 |
| 2004/0143428 A1* | 7/2004 | Rappaport | G06F 30/18 |
| | | | 703/22 |
| 2005/0086339 A1 | 4/2005 | Krishnan | |
| 2005/0208949 A1 | 9/2005 | Chiueh et al. | |
| 2010/0131668 A1 | 5/2010 | Kamath et al. | |
| 2010/0191856 A1* | 7/2010 | Gupta | H04L 61/4511 |
| | | | 709/228 |
| 2010/0195602 A1 | 8/2010 | Kovvali et al. | |
| 2011/0176418 A1 | 7/2011 | Gershinsky et al. | |
| 2011/0239273 A1* | 9/2011 | Yang | H04L 47/521 |
| | | | 709/224 |
| 2011/0276442 A1 | 11/2011 | Momtahan et al. | |
| 2012/0020216 A1 | 1/2012 | Vashist et al. | |
| 2012/0124196 A1 | 5/2012 | Brisebois et al. | |
| 2013/0077487 A1* | 3/2013 | Jackson | H04L 47/286 |
| | | | 370/231 |
| 2013/0084865 A1 | 4/2013 | Agrawal et al. | |
| 2013/0132854 A1 | 5/2013 | Raleigh et al. | |
| 2014/0148122 A1 | 5/2014 | Meredith et al. | |
| 2014/0359155 A1 | 12/2014 | Wan et al. | |
| 2015/0045051 A1* | 2/2015 | Meredith | H04W 52/0229 |
| | | | 455/552.1 |
| 2015/0103772 A1* | 4/2015 | Carnero Ros | H04L 45/04 |
| | | | 370/329 |
| 2015/0113549 A1 | 4/2015 | Wolf et al. | |
| 2015/0172958 A1 | 6/2015 | Allanki et al. | |
| 2015/0295728 A1 | 10/2015 | Kadel et al. | |
| 2015/0350974 A1 | 12/2015 | Patil et al. | |
| 2015/0372750 A1 | 12/2015 | Wu et al. | |
| 2016/0050588 A1 | 2/2016 | Schoenen et al. | |
| 2016/0309345 A1 | 10/2016 | Tehrani et al. | |
| 2016/0316388 A1 | 10/2016 | Rosen | |
| 2017/0111854 A1* | 4/2017 | Ho | H04W 24/02 |
| 2017/0195245 A1* | 7/2017 | Bhatia | H04L 45/745 |
| 2017/0201458 A1 | 7/2017 | Rivera et al. | |
| 2017/0201850 A1 | 7/2017 | Raleigh et al. | |
| 2017/0272343 A1 | 9/2017 | Giles | |
| 2017/0347063 A1 | 11/2017 | Singh et al. | |
| 2017/0374121 A1 | 12/2017 | Phillips et al. | |
| 2022/0321486 A1 | 10/2022 | Meredith et al. | |

OTHER PUBLICATIONS

Final Office Action received for U.S. Appl. No. 16/842,971 dated Jan. 6, 2022, 7 pages.

Non-Final Office Action received for U.S. Appl. No. 15/435,921 dated Aug. 28, 2018, 28 pages.

Non-Final Office Action received for U.S. Appl. No. 15/435,921 dated Sep. 5, 2019, 12 pages.

Non-Final Office Action received for U.S. Appl. No. 16/842,971 dated Sep. 24, 2021, 43 pages.

* cited by examiner

700

START 701

DETERMINE THRESHOLD
LOAD LEVEL
710

DETERMINE AVERAGE
LOAD LEVEL
720

COMPARE AVERAGE LOAD
LEVEL TO THRESHOLD
730

DOES AVERAGE LOAD LEVEL
EXCEED THRESHOLD?
735

YES          NO

IDENTIFY DATA STREAM
740

SELECT MOBILE DEVICES
745

SELECT PACKET
750

CONTROL PACKET DATA RATE
760

END 790

*800*

START 801

DETERMINE WHETHER RADIO IS CONTROLLING A DATA RATE
810

RECEIVE RADIO LOAD INFORMATION
820

RECEIVE ADDITIONAL RADIO LOAD INFORMATION
825

CALCULATE RADIO LOAD BASED ON RECEIVED AND ADDITIONAL LOAD INFORMATION
830

PROVIDE RADIO LOAD
840

END 890

900

START 901

RECEIVE DATA VOLUME
INFORMATION
910

COMPARE DATA VOLUME TO A
DOMAIN VOLUME THRESHOLD
920

DOES DATA VOLUME EXCEED
DOMAIN VOLUME THRESHOLD?
925

YES        NO

RECEIVE PACKET ATTRIBUTE
INFORMATION
930

NO

IS PACKET AVAILABLE FOR
DATA RATE CONTROL?
950

PROVIDE INDICATION THAT
DOMAIN IS AVAILABLE FOR
DATA RATE CONTROL
960

YES

END 990

CONTROLLING DATA RATE BASED ON DOMAIN AND RADIO USAGE HISTORY

RELATED APPLICATIONS

This application is a continuation of U.S. patent application Ser. No. 17/807,879, filed Jun. 21, 2022, which is a continuation of U.S. patent application Ser. No. 16/842,971, filed Apr. 8, 2020 (now U.S. Pat. No. 11,398,986), which is a divisional of U.S. patent application Ser. No. 15/435,921, filed Feb. 17, 2017 (now U.S. Pat. No. 10,659,375). All sections of the aforementioned application(s) and patent(s) are incorporated herein by reference in their entirety.

TECHNICAL FIELD

This disclosure relates generally to the field of mobile network data throughput, and more specifically relates to managing data traffic on a particular mobile network node during periods of peak load.

BACKGROUND

Operators of mobile networks provide voice service and/ or data service, including service to users of mobile telephones or mobile computing devices. Voice and data service may be provided by a radio access node (also "radio," "node," or "RAN"), such as a radio that provides coverage for an area of the mobile network. The radio provides service to users of the mobile network, such as to a geographical region or to a portion of the user population. Users may travel in and out of the coverage area of the radio while using their mobile devices, and users may choose to access different services via the radio. These circumstances may lead to constantly changing demands (also, "load") on the radio's capacity. In addition, the changing load of the radio may follow a cyclical pattern, such as a pattern of peak demand during certain times of day. It is desirable to provide a consistently high level of service to users of the radio.

An installed radio provides voice and data service for users in an area of the mobile network. Radios may be capable of providing service (also, "carrying traffic") for users desiring voice service (also, "voice traffic"), users desiring data service (also, "data traffic"), or to both. The capacity of the radio may be determined by the radio's technology type (e.g., meeting the Global System for Mobile Communications ("GSM") standard or the Long-Term Evolution ("LTE") standard). The capacity of the radio may also be determined by the radio's technical specifications, age, software or firmware version, or other factors.

Users of mobile devices may expect to have a high level of service regardless of a radio's capacity or pattern of peak demand. One technique to provide a high level of service is to increase the number of radios capable of providing service. However, factors such as geographical features or regulatory requirements may prevent network operators from installing additional radios in certain areas. In addition, installing additional radios may be costly, and if the peak demand periods only occur occasionally (e.g., busy commuting hours, holidays), the additional radios may remain idle much of the time. It is desirable for a mobile network operator to manage services provided by a radio, such as during peak demand periods.

For example, users of mobile communications networks often choose to consume data using their mobile communications devices. The mobile device may connect to a radio and consume (e.g., download and/or upload) data in the form of websites, music, videos, e-books, game information, or any other suitable data types. Different types of data comprise different amounts of data, and may consume a different portion of the capacity of the radio. A user that is watching a video may consume a larger portion of a radio's data bandwidth compared to a user that is sending an email. In addition, multiple users consuming data while connected to the same radio may overburden the capacity of the radio. For example, users waiting at an airport may choose to spend their time watching videos on their mobile devices. At busy times, radios that provide coverage to the airport may be overburdened by a large group of users watching videos, and a user attempting to send an email (such as a traveler needing to be picked up at the airport) may suffer service interruptions. If a mobile network operator manages radio services related to a video data type, the radio's capacity may no longer be overburdened, and services related to a text data type (e.g., the user's email) may be provided without interruption.

Current solutions for reducing data traffic include determining whether a particular mobile device is currently using a large portion of available data bandwidth, and controlling the data rate to that device. However, information regarding data usage is received in periodic intervals (e.g., 1-5 minute intervals), and many data transactions are shorter in length than this interval. A mobile device may have its data rate controlled incorrectly, based on outdated periodic data usage information. In addition, controlling a data rate for a mobile device based on periodic data usage information may control the data rate for all types of data. If a user is attempting to use multiple types of data, controlling all types of data may cause problematic interruptions in service. For example, if a user is accessing a website while a video is playing, controlling all data types may cause interruptions in a financial transaction on the website.

It is desirable for the mobile network operator to determine whether a particular mobile device is likely to access a data type associated with high-bandwidth data consumption. It is further desirable for a mobile network operator to determine whether a data rate for a high-bandwidth data type may be managed, such that data rates for a low-bandwidth data type are not affected.

SUMMARY

A domain may provide high-bandwidth data types to mobile devices (e.g., a video-sharing website). A mobile device (e.g., a mobile phone, a smart phone, tablet device, a wearable or embedded communications device) may access the domain and receive a large volume of data from the domain, via a mobile network. The domain and the mobile device may exchange data via a radio access node, such as a radio access node included in a mobile network. A network operator of the mobile network may determine, based on historical types and volumes of data provided by the domain, that mobile devices accessing the domain are likely to receive large volumes of high-bandwidth data types from the domain. The network operator may manage a data rate related to data, or a portion of the data, that is associated with the domain. Based on the historical information, the network operator may manage the data rate for a particular mobile device, a particular radio, a particular range of time, a particular data type, or any combination of these. The data rate may be managed by a network gateway, such as a gateway included in the mobile network.

A network gateway may receive information describing a capacity and a historical load level of a radio access node.

A threshold load level for the radio is determined based on the capacity. An average load level for the radio is determined based on the historical load level. The average load is compared to the threshold. If the average load exceeds the threshold, the network gateway may identify a stream of data traffic that is associated with a domain with a history of high-bandwidth data transactions. The data stream may also be associated with a mobile device that has a history of high-bandwidth data transactions with the domain. The data stream may also be associated with a data type associated with high-bandwidth data transactions with the domain.

The network gateway may select a set of packets associated with the data stream. The set of packets may be selected based on a data type associated with the packets. The network gateway may delay a delivery of each of the packets to the mobile device associated with the data stream. In some cases, the network gateway may determine that the average load level ceases to exceed the threshold. Responsive to this determination, the network gateway may cease delaying the delivery of the set of packets.

The network operator may determine that a particular mobile device accessing a particular domain is likely to receive large volumes of high-bandwidth data types, based on historical types and volumes of data received by the device from the domain. The network operator may determine that the mobile device is accessing a radio with an average load level that exceeds a threshold load level for that radio. The network operator may determine a set of packets associated with the mobile device. The set of packets may be determined based on the packets' association with the particular domain and with a data type. The network operator may delay a delivery of each of the packets to the mobile device. In some cases, the network operator may determine that the mobile device ceases to access the radio with an average load level that exceeds the threshold. Responsive to this determination, the network operator may cease delaying the delivery of the set of packets.

These illustrative examples are mentioned not to limit or define the disclosure, but to provide examples to aid understanding thereof. Additional embodiments are discussed in the Detailed Description, and further description is provided there

BRIEF DESCRIPTION OF THE DRAWINGS

Features, embodiments, and advantages of the present disclosure are better understood when the following Detailed Description is read with reference to the accompanying drawings.

DETAILED DESCRIPTION

The described implementations provide techniques for managing services, such as data services, that are provided via a mobile network. The mobile network may include a radio access node and a network gateway. A group of users using a group of respective mobile devices may access data services via the radio access node and the gateway. The gateway may determine that the accessed data includes a data stream associated with a domain with a history of high-bandwidth transactions. In addition, the gateway may determine that the radio access node is operating above a threshold load level. The gateway may select a set of packets associated with high-bandwidth transactions with the domain. Delivery of one or more packets in the selected set may be delayed. If the gateway determines that the radio access node is no longer operating above the threshold level, delivery of packets in the selected set may no longer be delayed.

Figure 1:
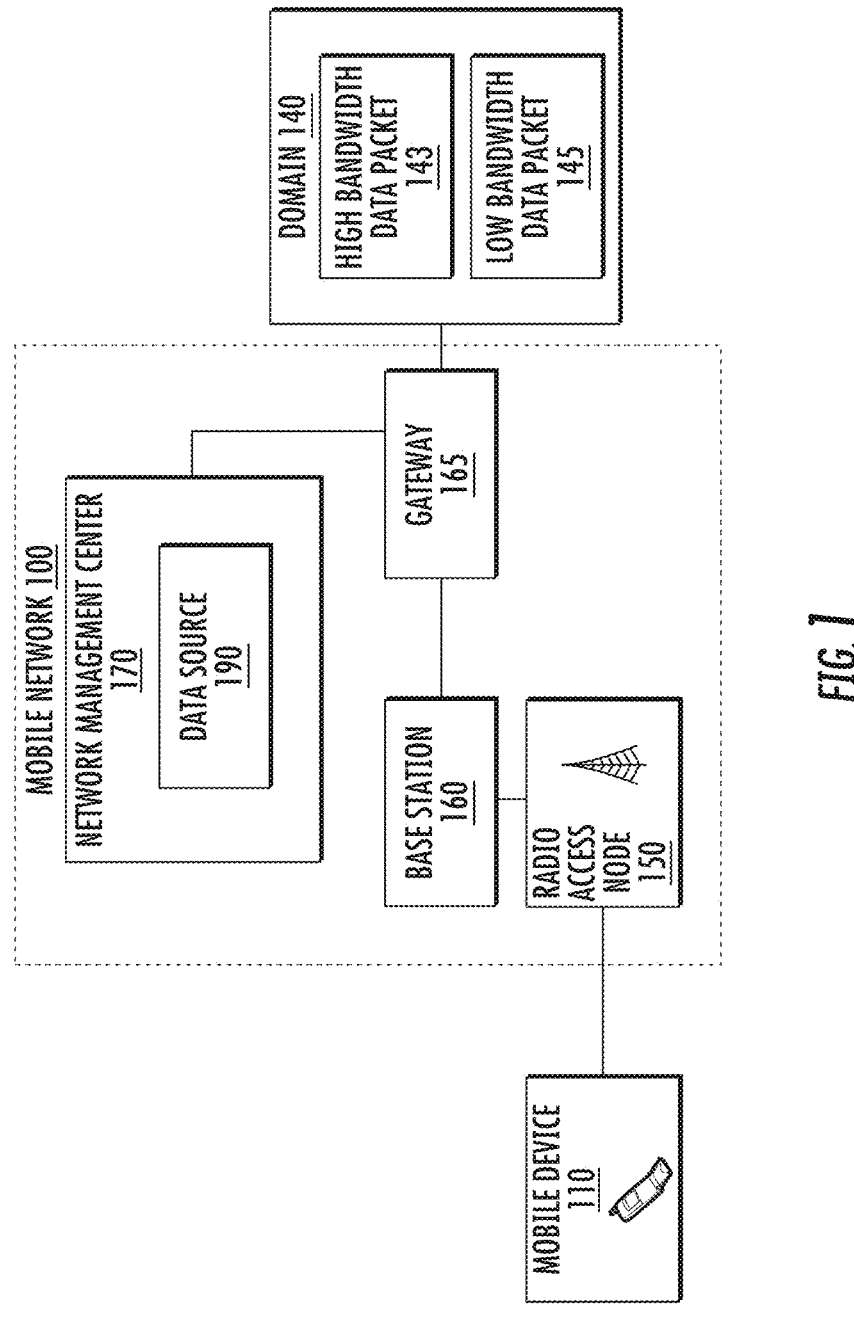
FIG. 1 is a diagram depicting an exemplary mobile communications system capable controlling data rates based on historical data associated with a domain.

The following examples are provided to introduce certain details of the disclosed implementations. Referring now to the drawings, FIG. 1 depicts an exemplary mobile communications system capable of managing services based on historical data associated with a domain. A mobile network 100 may include one or more network management center(s) 170, radio access node(s) 150, base station(s) 160, or network gateway(s) 165. The gateway 165 may communicate with one or more network management centers 170, and with one or more base stations 160. One or more radios 150 may communicate with the base station 160. The mobile network can have other configurations. For example, radio 150 may communicate directly with gateway 165.

A mobile device 110 may connect to the mobile network 100 via the radio node 150. The mobile device 110 may access various services provided by the mobile network 100, including, but not limited to, voice services or data services. Information associated with the accessed services may be provided to and received from mobile device 110, and may be provided to and received from any combination of components included in mobile network 100. For example, mobile device 110 may receive information associated with voice services from radio node 150, additional radio nodes, and/or additional mobile devices.

The network gateway 165 may transmit information associated with voice services or data services. For example, gateway 165 may transmit data to and from a domain 140 (e.g., upload/download). The domain 140 may include a website, a file transfer site, a data repository, or any other suitable domain type. The domain may include one or more devices that provide or receive transmitted data. The transmitted data may include packets associated with high-volume data transactions, such as high-bandwidth data packet 143. In addition, the transmitted data may include packets associated with low-volume data transactions, such as low-bandwidth data packet 145. Packets 143 or 145 may be transmitted to and from the mobile device 110 via the gateway 165 or other components of the mobile network 100. Packets 143 or 145 may have an associated data type or media type. For example, the high-bandwidth data packet 143 may have a media type associated with high-bandwidth data, such as video or audio media files. The low bandwidth data packet 145 may have a media type associated with low bandwidth data, such as email, photo, or text media files. The media type of a particular data packet may be determined based on metadata associated with the packet (e.g., scanning a data type header of the packet).

The network gateway 165 may transmit information to and from network management center 170. For example, gateway 165 may provide information describing radio node 150, such as information describing the radio's current operations. In addition, gateway 165 may provide information describing transmitted data that is associated with domain 140. The provided information may describe a recipient mobile device, a volume of data, a data type, a source, a destination, or other suitable information. In addition, gateway 165 may receive information, such as from the network management center 170. The received information may be intended for the gateway 165 (e.g., instructions to modify operation of the gateway), or the received information may be transmitted by the gateway 165 to an additional destination, such as domain 140 or radio node 150.

The network management center 170 may receive information, such as information provided by gateway 165. The network management center 170 may store the received information, or indications based on the received information, or both. For example, the network management center 170 may receive information describing transmitted data associated with domain 140. The network management center 170 may determine, based on the received information describing the transmitted data, that the domain 140 has a history of high-bandwidth data transactions. The network management center 170 may store in a data source 190 one or both of an indication that the domain 140 has a history of high-bandwidth data transactions, or the information describing the transmitted data.

In addition, the network management center 170 may receive information describing a capacity of the radio node 150 to provide data to mobile device 110. The network management center 170 may determine, based on the received information describing the capacity, a threshold load level for the radio 150. In addition, the network management center may receive information describing historical levels of data traffic provided via the radio 150. The network management center 170 may determine, based on the received information describing the historical data traffic, that the radio node 150 has an average load level. The network management center 170 may store in a data source 190 one or more of an indication of the threshold load level, an indication of the average load level, the information describing the radio's capacity, or the information describing the historical data traffic levels.

The network management center 170 may provide information, such as to the network gateway 165. The provided information may include operation instructions, such as instructions for one or more of gateway 165, radio node 150, or base station 160. For example, the network management center 170 may provide instructions associated with the operation of the network gateway 165. The operation of gateway 165 may be modified based on the received instructions. Instructions received by radio node 150 may modify the operations of radio 150. In addition, instructions received by base station 160 may modify the operations of base station 160.

In some cases, information provided by the network management center 170 may allow management of services provided by radio node 150. For example, instructions provided to gateway 165 may modify operation of gateway 165 to delay data packets associated with the domain 140 and with the mobile device 110.

Although FIG. 1 depicts gateway 165 and network management center 170 as separate components of mobile network 100, other configurations are available. For example, gateway 165 may be included in network management center 170 or other network control device. In addition, although FIG. 1 depicts data source 190 as a sub-component of network management center 170, other configurations are available. For example, data source 190 may be separate from network management center 170, such as a database accessed via a network. The gateway 165 and the network management center 170 may include processing devices, as well as computer-executable instructions stored in a computer-readable media. The processing devices may execute the computer-executable instructions to perform the operations described herein.

Determining Loads Carried by Radios

Figure 2:
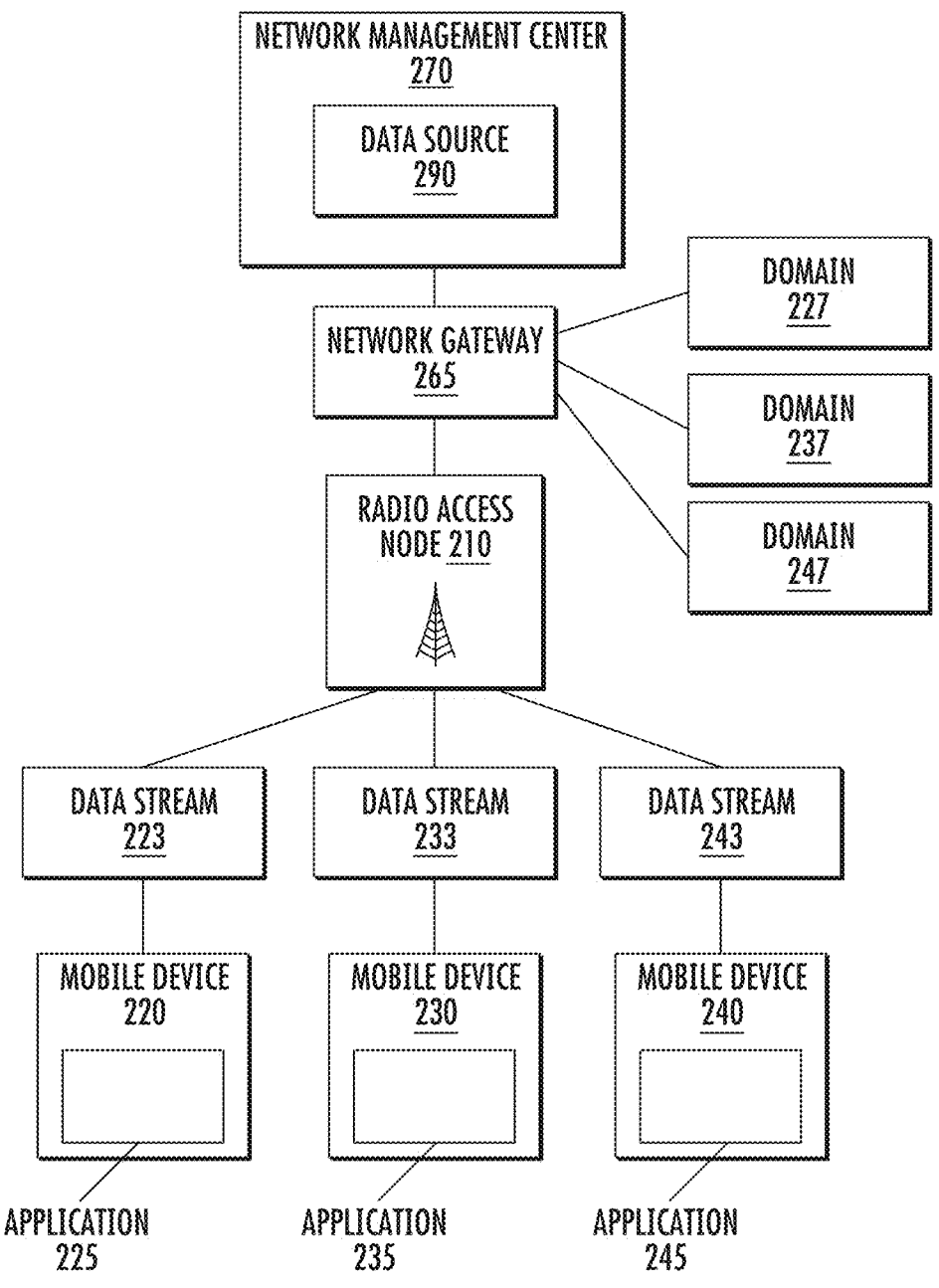
FIG. 2 is a diagram illustrating an exemplary technique for determining an average load of a radio.

FIG. 2 is a diagram illustrating an exemplary technique for determining an average load level of a radio. In FIG. 2, a radio access node 210 communicates with a network gateway 265, and the gateway 265 communicates with a network management center 270. In some cases, the radio 210 communicates with the gateway 265 via a base station. During a time period (e.g., 1-5 minutes), the radio 210 may be in communication with mobile devices 220, 230, and 240. The mobile devices 220, 230, and 240 may access data services via radio 210, such that radio 210 carries data traffic associated with each of the mobile devices. For example, data stream 223 may be associated with mobile device 220 and application 225. Data stream 233 may be associated with mobile device 230 and application 235. Data stream 243 may be associated with mobile device 240 and application 245. The data services accessed by mobile devices 220, 230, and 240 may be transmitted via gateway 265 and/or radio 210. In some cases, additional mobile devices in communication with radio 210 may not access data services during the time period. For example, the additional mobile devices may communicate with the radio to access voice services or short messaging systems.

In one implementation, one or more of network gateway 265 and radio 210 may collect information associated with the data services provided during the time period. For example, the collected information may describe a volume of data associated with a particular domain, a volume of data associated with a particular mobile device, a data type or media type of a data packet, a time of delivery of a packet, a source or destination of a data packet (e.g., a particular address within a domain, an application running on a mobile device or domain), a mobile device identifier, a setting associated with a mobile device or domain, or any other suitable information. Some or all of the information may be collected by both network gateway 265 and radio 210.

The collected information may be associated with one or more of the mobile devices 220, 230, and 240, or with one or more of the domains 227, 237, and 247. For example, mobile device 220 may receive data stream 223 associated with application 225 and domain 227. The radio 210 may collect information describing an identification of the mobile device 220, a volume of data stream 223, and a delivery time of each packet included in the data stream 223. The gateway 265 may collect information describing the domain 227, an indication of application 225, and a media type of each packet included in the data stream 223. The information associated with mobile device 220 may indicate that device 220 received a small volume of data, from domain 227, for a web-browsing application 225, and the data packets have a text media type. In addition, mobile device 230 may provide data stream 233 associated with application 235 and domain 237. The information associated with mobile device 230 may indicate that device 230 provided a small volume of data, to domain 237, from an email application 235, and the data packets have a text media type. In addition, mobile device 240 may provide data stream 243 associated with application 245 and domain 247. The information associated with mobile device 240 may indicate that device 240 received a large volume of data, from domain 247, for a video application 245, and the data packets have a video media type.

One or more load levels of the radio 210 may be determined based on the collected information. For example, the collected information may be provided to network management center 270. The network management center 270 may determine a load (e.g., an amount of data carried) for radio 210 during the time period. The load may be associated with a specific time and/or date attribute (e.g., a load for the five-minute time period ending at 10:45:00 on a particular date). The load may be correlated with additional information, such as additional information stored in data source 290. For example, the current load for the current time period may be correlated with additional loads for additional time periods.

Based on the correlation, the network management center 270 may calculate an average load level for radio 210. For example, the current load may be correlated with additional loads having related time/date attributes, and a periodic average load may be calculated for the radio (e.g., hourly average load, daily average load at 9:00 AM, annual average load at 7:00 PM on a particular holiday). In addition, the determined load may be correlated with a series of additional loads having incremental time/date attributes, and a rolling average load may be calculated for the radio (e.g., a rolling average of the previous 30 minutes, a rolling average of the previous 24 hours at hourly increments).

In addition, the network management center 270 may calculate a predicted load level for radio 210. For example, a predicted load level may be calculated based on the average load level of the radio at a particular time of day. In addition, the predicted load level may be calculated based on the current load level and the average load level. For example, if the current load level is 15% greater than the average load level for the present time, the predicted load level for a subsequent time may be calculated as 15% greater than the average load level for that subsequent time. The predicted load level may be associated with a time interval, such as an upcoming time interval. In some cases, the predicted load level is based on historical load information, such as additional loads from previous time periods.

In some cases, the predicted load level for radio 210 may be calculated based on additional load levels of additional radios. For example, a group of radios including radio 210 may provide coverage in an area, such as along a busy highway. If a particular mobile device 220 is determined to be transitioning between the radios, the information collected regarding mobile device 220 may indicate that the mobile device 220 is transitioning in a particular direction, such as in a direction of vehicle traffic on the highway. A predicted load level for radio 210 and an associated time interval may be calculated based on information collected by the additional radios in the group. For example, the predicted load level may be based on information indicating a volume of data included in data stream 223. The time interval may be based on information indicating a frequency at which the mobile device 220 is transitioning between radios.

Load levels, including average or predicted loads, may have an attribute based on the service associated with the load. For example, an average load for data service may have an uplink or downlink attribute, indicating that the average load was determined based on data that was uploaded or downloaded, respectively, to the radio. In addition, network management center 270 may determine an average voice load, indicating an average amount of voice services carried by the radio 210.

One or more of a particular domain, mobile device, or time/date may be associated with an average load level. For example, the load determined for the radio 210, as described above, may be associated with domains 227, 237, or 247, and may have an indication that a large volume of data included in the determined load is associated with domain 247. Average load levels calculated based on the determined load may have an indication that domain 247 is associated with a large average volume of data, such as over a series of additional loads included in the calculation of the average. In addition, the determined load may have an indication that a large volume of included data is associated with mobile device 240, or application 245, or a particular time that is included during the time period of the determined load. Average load levels calculated based on the determined load may have indications that one or more of the mobile device 240, application 245, or the particular time are associated with a large average volume of data. The determined load or indications may be correlated with historical information, such as information stored in data source 290. For example, the network management center 270 may store an indication that the domain 247 has a history of being associated with a large average volume of data.

Determining Peak Demand or Thresholds

FIG. 3 is a diagram illustrating an exemplary technique for determining a peak demand of a radio. For example, a radio access node may communicate with a base station, network gateway, and network management center, as described with regards to FIG. 2. During a time period, the radio may be in communication with one or more mobile devices. The mobile devices may access data services via the radio or gateway. The accessed data services may be associated with one or more respective applications operating on each mobile device.

Figure 3A:
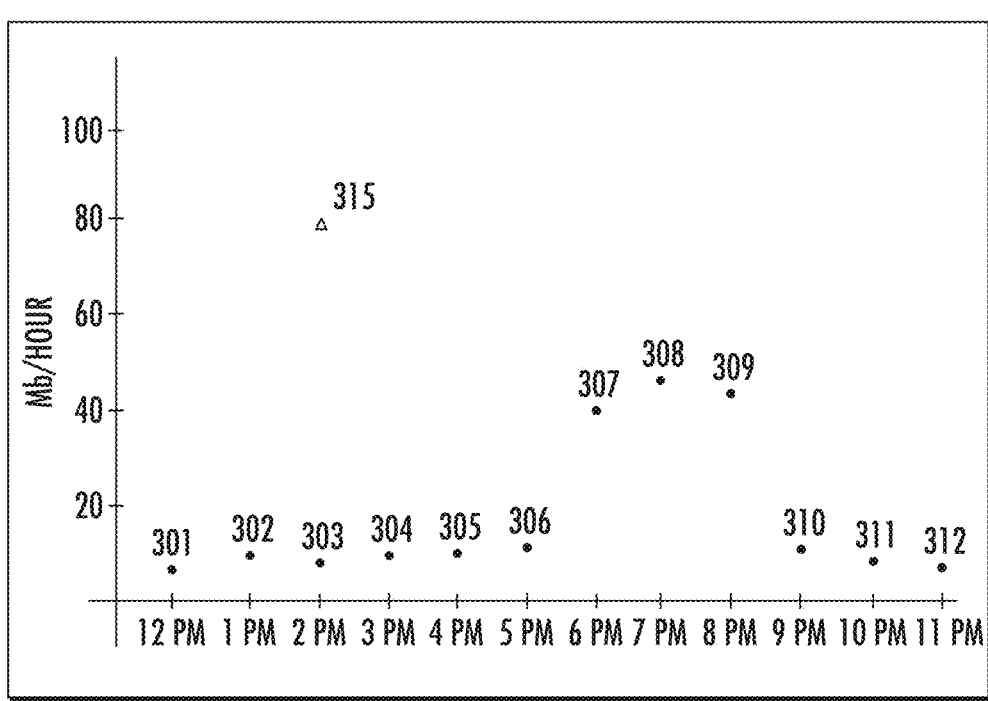
FIGS. 3A and 3B (collectively referred to herein as FIG. 3) are diagrams illustrating exemplary techniques for determining a peak demand of a radio or a threshold of a radio.

In one implementation, the radio, gateway, or network management center may collect information associated with the data services accessed during the time period, as described in regards to FIG. 2. A load may be determined and correlated with additional information, such as stored historical load levels. In FIG. 3A, an example determined load level, such as the load represented by point 315, is correlated with example historical load levels, such as the loads represented by points 301-312. The load levels 301-312 and 315 may be associated with data services accessed via a particular radio. In addition, each of the load levels 301-312 and 315 may be associated with a time period, such as respective hourly intervals between noon until 11 PM. The load levels 301-312 may each indicate an average load level for the respective time period, such as an average volume of data transmitted during the hourly interval over multiple days. The load level 315 may indicate a current load level for the respective time period, such as a calculated volume of data transmitted during the hour on a particular day. A comparison of current load level 315 to the average load level 303 may indicate that the current load level is greater than the average load level for the particular hour.

One or more of the current load level or an average load level may be identified as a peak demand for the radio. In FIG. 3A, the average load levels 307, 308, and 309 may be compared to the average load levels 301-306 and 310-312. The comparison may indicate that the volumes of average loads 307, 308, and 309 (e.g., between about 40 Mb/hour and about 45 Mb/hour) is greater than the volumes of average loads 301-306 and 310-312 (e.g., between about 3 Mb/hour and about 7 Mb/hour). Based on the comparison, average loads 307, 308, and 309 may be identified as peak demands, such as average peaks for the example twelve-hour period shown in FIG. 3A. In addition, current load level 315 may be compared to the average load levels 301-312. The comparison may indicate that the volume of the current load 315 (e.g., about 80 Mb/hour) is greater than the volumes of average loads 301-312. Based on the comparison, current load 315 may be identified as a peak demand, such as a current peak for the particular date associated with the load level 315.

Peak demands may be identified for a radio based on a comparison of a load level to another load level (e.g., a current load compared to an average load), or a comparison of a load level to a threshold (e.g., 75% of the radio's capacity), or any other suitable comparison. One or more peak demands may be identified for the radio. In addition, peak demands may be associated with a time/date (e.g., a holiday, daily at 5 PM), an event (e.g., bad weather, high-population sporting events), or any suitable attribute. An average peak demand may be calculated, based on a group of peak demands having related time/date attributes.

A load threshold may be determined for a radio. The load threshold may be determined based on the radio's load, capacity, or other suitable attributes. For example, a load threshold for radio may be determined based on the average load levels, or the peak demand, or both. In addition, the load threshold may be determined based on the capacity of the radio, such as a maximum amount of data that the radio is capable of carrying. The capacity may be a theoretical capacity based on ideal conditions, or an effective capacity based on typical working conditions. In addition, the load threshold may be determined based on a performance of the radio, such as the radio's performance when carrying a large volume of data. Performance of the radio may be determined based on errors reported by mobile devices, repeated data requests, transmission failures, or any other suitable metric.

Figure 3B:
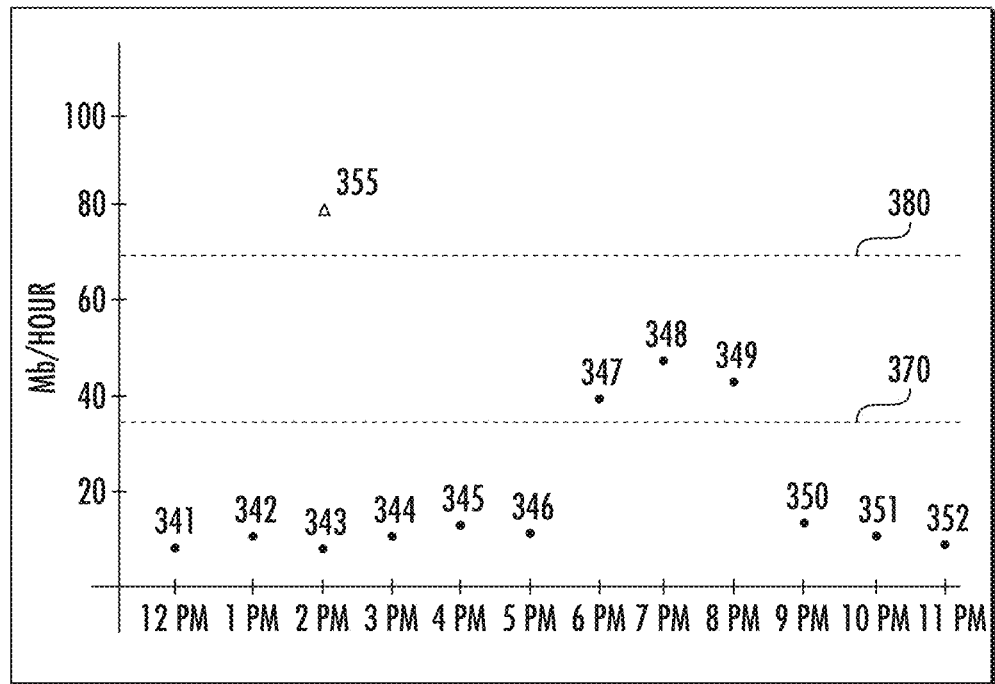

In FIG. 3B, an example determined load level, such as the load represented by point 355, is correlated with example historical load levels, such as the loads represented by points 341-352. The load levels 341-352 and 355 may be associated with data services accessed via a radio and further associated with one or more time periods, as described in regards to FIG. 3A. Average loads 347, 348, and 349 may be identified as average peak demands.

In one implementation, a load threshold, such as the first load threshold 370, may be determined for the radio. Load threshold 370 may be determined based on the average peak demands 347, 348, and 349. For example, if the volumes of average peaks 347, 348, and 349 are each about 40 Mb/hour or greater, load threshold 370 may have a value of about 36 Mb/hour (e.g., 90% of the lowest average peak volume). One or more data rates may be controlled based on the load threshold 370. For example, if a current load, such as load level 355, has a volume greater than the first load threshold 370 volume, a first set of mobile devices in communication with the radio may have a data rate controlled.

More than one load threshold may be determined for the radio. An additional threshold, such as second load threshold 380, may be determined based on a capacity of the radio. For example, the radio associated with load levels 341-352 and 355 may have an effective capacity of 100 Mb/hour. Load threshold 380 may have a value of about 75 Mb/hour (e.g., 75% of the radio's effective capacity). One or more data rates may be controlled based on the load threshold 380. For example, if a current load, such as load level 355, has a volume greater than the second load threshold 380 volume, a second set of mobile devices in communication with the radio may have a data rate controlled.

Load thresholds may have attributes, such as a quantity of mobile devices, a quantity of domains, a duration of a time delay, a hysteresis, or other suitable attributes. For example, load threshold 370 may have a hysteresis attribute, such that the radio controls data rates if the current load level exceeds the threshold 370 for a particular duration of time, or stops controlling data rates if the current load level remains below the threshold 370 for the duration of time. In addition, load thresholds 370 and 380 may each have an attribute indicating a quantity of mobile devices with controlled data rates. First load threshold 370 may have an attribute indicating a first quantity of mobile devices (e.g., 10% of mobile device in communication with the radio). If the current load has a volume greater than the first load threshold 370, then data rates for 10% of the mobile devices may be controlled. . . . In addition, second load threshold 380 may have an attribute indicating a second quantity of mobile devices (e.g., 15% of mobile device in communication with the radio). If the current load has a volume greater than the second load threshold 380 volume, data rates for 15% of the mobile devices may be controlled.

Identifying Historical Behavior

Figure 4:
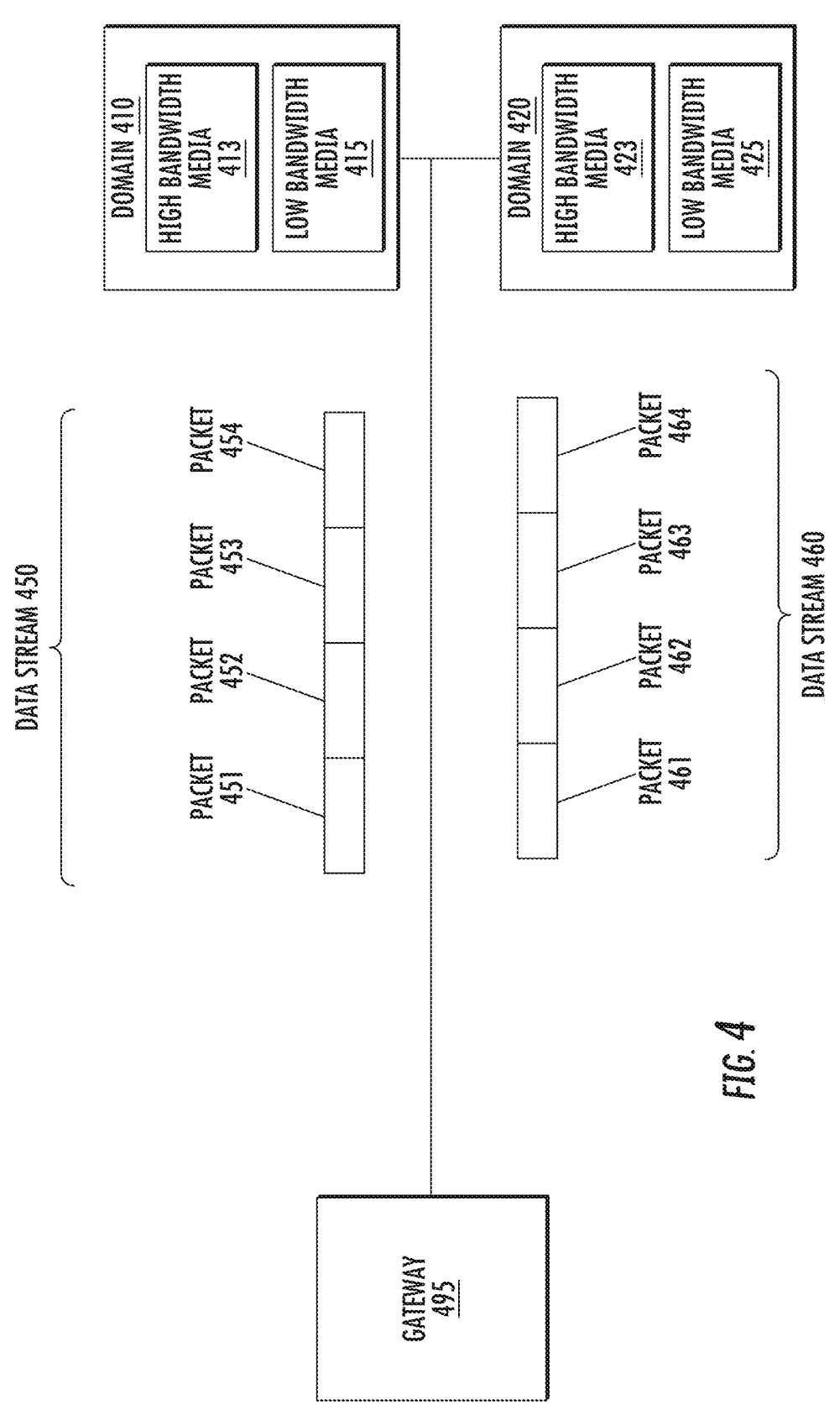
FIG. 4 is a diagram depicting an exemplary technique of determining attributes of data associated with a domain.

Data included in one or more of a determined load, an average load, or a peak demand, may be associated with one or more portions of data. For example, data included in a load for a radio may include one or more data streams. Each data stream may be associated with a domain, a mobile device, or both. A data stream may have attributes, such as a volume, a data type, a destination application, or any other suitable attribute. FIG. 4 is a diagram depicting an exemplary technique of determining attributes of data associated with a domain. Similar techniques may be used to determine attributes of data associated with a mobile device.

In one implementation, a gateway 495 may transmit data associated with domains 410 and 420. Domain 410 may provide and receive data via data stream 450, including data packets 451 through 454. Domain 420 may provide and receive data via data stream 460, including data packets 461 through 464. The data streams 450 and 460 may comprise data packets that are transmitted to (or from) the gateway 495, and the transmitted data packets may be transmitted to (or from) one or more mobile devices.

Domains 410 and 420 may include various products and services that are accessible (such as by mobile devices). For example, domain 410 may include high-bandwidth media 413 (e.g., a video streaming service) and low-bandwidth media 415 (e.g., a payment website). Data packets 451, 452, and 453 may be associated with the high-bandwidth media 413, and packet 454 may be associated with the low-bandwidth media 415. In addition, domain 420 may include low-bandwidth media 425 (e.g., an email service) and high-bandwidth media 423 (e.g., online help videos). Data packets 461, 462, and 463 may be associated with the low-bandwidth media 425, and packet 464 may be associated with the high-bandwidth media 423.

The network gateway 495 may determine one or more attributes of the transmitted packets. In addition, gateway 495 may collect information regarding the transmitted packets, including information regarding attributes. For example, the gateway 495 may receive packets 451 through 454 and 461 through 464. The gateway 495 may analyze the received packets. Non-limiting examples of analysis techniques include header inspection and deep-packet inspection, but other analysis techniques may be used. Based on the analysis of the received packets, gateway 495 may determine attributes of the packets. For example, gateway 495 may determine that packets 451 through 454 are associated with domain 410, and that packets 461 through 464 are associated with domain 420. In addition, gateway 495 may determine that packets 451-453 and 464 have a video media type and a relatively large size (e.g., a larger volume of data). Gateway 495 may determine that packets 454 and 461-463 have a text media type and a relatively small size (e.g., a smaller volume of data). In addition, gateway 495 may determine that packets 451-453 and 464 are associated with the respective high-bandwidth media 413 and 423, and that packets 454 and 461-463 are associated with the respective low-bandwidth media 415 and 425. Gateway 495 may further determine a timestamp of each received packet, a destination, or any other suitable attribute.

The network gateway 495 may provide the determined attributes or other collected information to a network management center. The network management center may correlate the provided attributes with additional information to determine a history of behavior, such as for the domains 410 and 420, or for mobile devices associated with the attributes. For example, the media type and size of packets 451-454 may be correlated with the media type and size of other packets received from domain 410. Based on this correlation, the network management center may determine that domain 410 has a history of providing a large number of packets with a large size and a video media type. In addition, the media type and size of packets 461-464 may be correlated with the media type and size of other packets received from domain 420. Based on this correlation, the network management center may determine that domain 420 has a history of providing (or receiving) a large number of packets with a small size and text media type.

The network management center may determine the historical behavior of a domain or mobile device based on additional attributes. For example, based on packet timestamps associated with domain 410, it may be determined that domain 410 has a history of providing or receiving a large volume of video data (e.g., large number of packets with a large size and a video media type) during a range of times. In addition, based on a destination attribute of packets, it may be determined that domain 410 has a history of providing or receiving a large volume of video data to mobile devices in communication with a particular radio access node (e.g., a radio providing coverage at an airport). The network management center may store an indication that domain 410 is identified as a domain having a history of providing a large volume of video data. In addition, the network management center may store an indication that a particular mobile device is identified as a device having a history of receiving large volumes of video data from domain 410.

Controlling a Data Rate

Figure 5:
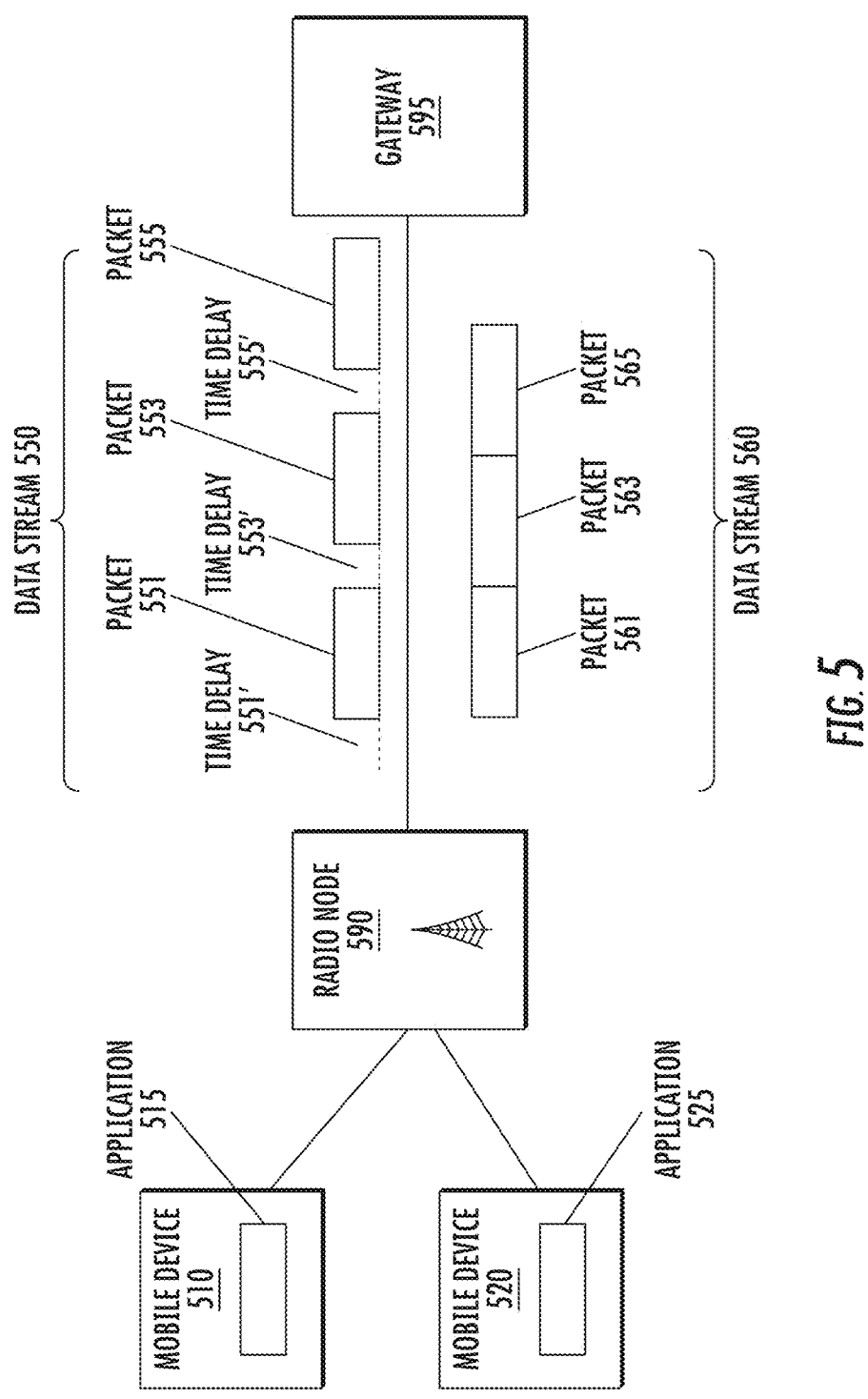
FIG. 5 is a diagram depicting an exemplary technique of controlling a rate of a data stream provided to a mobile device.

Data carried by a radio access node has a controlled data rate. The data rate may be controlled based on the data's association with a domain or a mobile device having a history of large-volume data transactions. FIG. 5 is a diagram depicting an exemplary technique of controlling a rate of a data stream associated with a mobile device. A radio access node 590 may transmit data to and from a network gateway 595. The transmitted data may include one or more data streams that are received from (or provided to) the gateway 595. For example, data streams 550 and 560 may be provided to the radio 590 from the gateway 595. Data stream 550 may include data packets 551, 553, and 555, having a video data type. The data packets 551, 553, and 555 may be associated with a domain that is indicated as having a history of high-volume data transactions. In addition, data stream 560 may include data packets 561, 563, and 565, having a text data type. The packets 561, 563 and 565 may be associated with another domain that has no indication of a history of high-volume data transactions.

The radio 590 may be in communication with mobile devices 510 and 520. Application 515 may operate on mobile device 510. Mobile device 510 may receive from (or provide to) radio 590 data associated with application 515, such as data that is included in data stream 550. In addition, application 525 may operate on mobile device 520. Mobile device 520 may receive from (or provide to) radio 590 data associated with application 525, such as data that is included in data stream 560.

It may be determined, that radio 590 is carrying data traffic above a threshold. For example, the radio 590 may have an average load level that is above a threshold level for the radio 590. In addition, it may be determined that data stream 550 carried by radio 590 is associated with a first domain having a history of high-volume data transactions. In addition, it may be determined that the data stream 550 is associated with a mobile device, such as mobile device 510, that has a history of high-volume data transactions with the first domain.

Based on one or more of these determinations, packets included in data stream 550 may have a controlled data rate. Controlling the data rate may include inserting a time delay before the included packet. For example, gateway 595 may receive an instruction to control the data rate of packets associated with the data stream 550. The gateway 595 may insert a time delay 551' before packet 551 before transmitting the packet 551 to radio 590. In addition, gateway 595 may insert a time delay 553' before packet 553 and a time delay 555' before packet 555. The time delays 551', 553', and 555' may control the data rate of data stream 550 such that the radio 590 transmits the packets 551, 553, and 555 after the respective time delays have elapsed. In some cases, the length of the time delay may be adjusted based on a margin by which the average load level of radio 590 exceeds the threshold level. For example, if the average load level of radio 590 exceeds the threshold by a large margin, the gateway 595 may insert a relatively long time delay. If the average load level exceeds the threshold by a small margin, the inserted time delay may be relatively short. Other ways of controlling the data rate may also be used, including inserting delays with different durations or inserting delays between groups of packets. The inserted time delay may be related to the current or predicted load on the radio. The gateway 595 may determine whether to insert a load-related time delay before a packet independently from or in addition to other delays determined by the mobile network (e.g., delays due to loss of service, delays due to security checks).

In one implementation, the radio node 590 may transmit a second data stream without controlling the data rate for the second data stream. For example, the gateway 595 may transmit packets 561, 563, and 565 included in data stream 560 without inserting a time delay. In some implementations, the radio 590 may transmit one or more of packets 561, 563, and 565 during the time delays 551', 553', and 555'.

Figure 6:
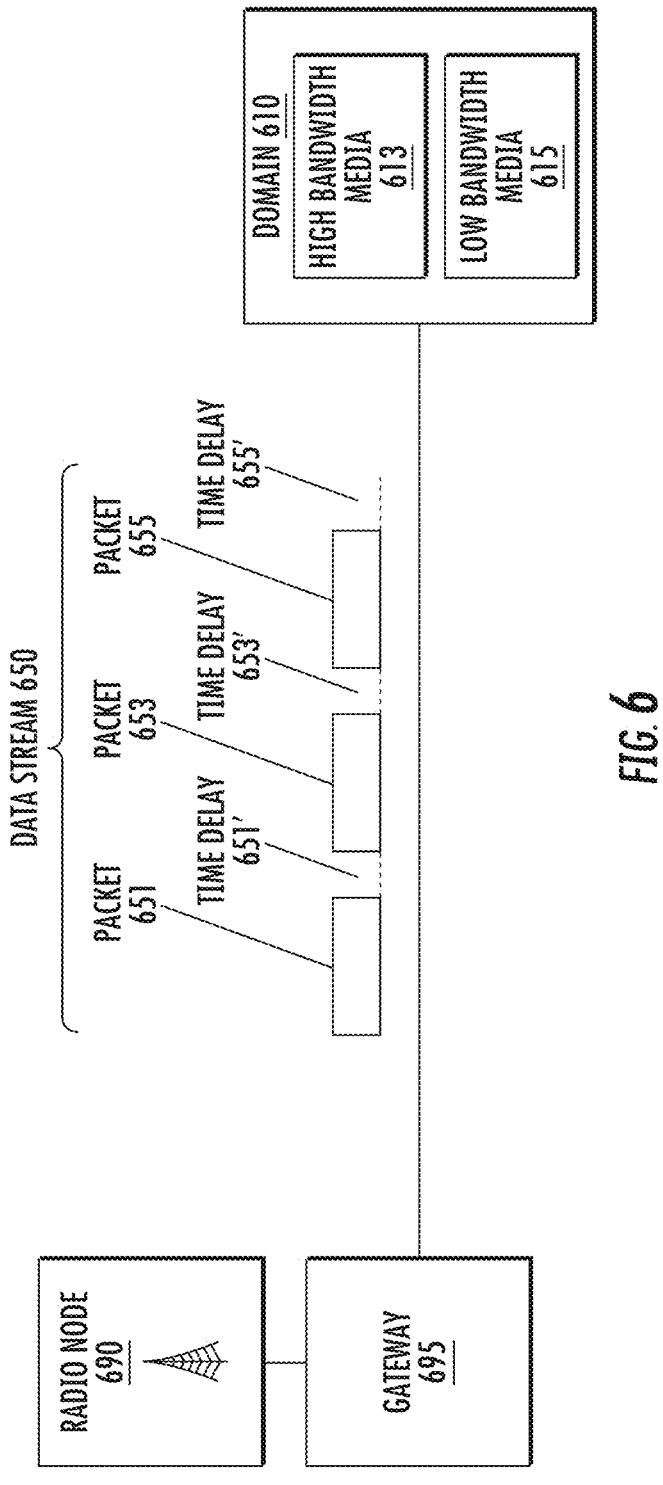
FIG. 6 is a diagram depicting an exemplary technique of controlling a rate of a data stream provided to a domain.

FIG. 6 is a diagram depicting an exemplary technique of controlling a rate of a data stream associated with a domain. A domain 610 may transmit data to and from a network gateway 695. The transmitted data may include one or more data streams that are received from (or provided to) the gateway 695. For example, data stream 650 may be provided to the domain 610 from the gateway 695. Data stream 650 may include data packets 651, 653, and 655. The data packets 651, 653, and 655 may be associated with a mobile device that is indicated as having a history of high-volume data transactions with the domain 610.

The domain 610 may include multiple functions. The multiple functions may be associated with various amounts or types of data traffic. For example, domain 610 may include high-bandwidth media 613, such as such as a video streaming application. The high-bandwidth media 613 may be associated with a large volume of data having a video data type. In addition, domain 610 may include a low-bandwidth media 615, such as a payment application. The low-bandwidth media 615 may be associated with a small volume of data having a text data type. Data associated with either media 613 or 615 may be received from gateway 695, such as from one or more mobile devices communicating via a radio 690.

It may be determined that radio 690 is carrying data traffic above a threshold. In addition, it may be determined that data traffic carried by radio 690, such as packets 651, 653, and 655 included in data stream 650, is associated with high-bandwidth media 613 on domain 610. In addition, it may be determined that the data stream 650 is associated with a mobile device that has a history of high-volume data transactions with the high-bandwidth media 613. The packets 651, 653, and 655 may include information initiating a high-volume data transaction with the high-bandwidth media 613. For example, the included information may indicate that the mobile device is requesting a video download, or has completed a previous video download.

Based on one or more of these determinations, packets included in a first data stream may have a controlled data rate. Controlling the data rate may include inserting a time delay before the included packet. For example, gateway 695 may receive an instruction to control the data rate of packets associated with data stream 650. The gateway 695 may insert a time delay 651' before packet 651 before transmitting the packet 651 to domain 610. In addition, gateway 695 may insert a time delay 653' before packet 653 and a time delay 655' before packet 655. The time delays 651', 653', and 655' may control the data rate of data stream 650 are such that the gateway 695 transmits the packets 651, 653, and 655 after the respective time delays have elapsed. In some cases, the length of the time delay may be adjusted.

The gateway 695 may transmit packets that are not associated with a high-volume data transaction without a time delay. For example, the gateway 695 may transmit additional packets without controlling the associated data rate. A non-limiting example of packets associated with domain 610 that are not associated with a high-volume data transaction includes packets associated with low bandwidth media 615, such as a payment request. The gateway 695 may transmit the payment request packets without inserting a time delay. In some cases, packets that are delayed and packets that are transmitted without delay may be associated with the same mobile device. For example, a user of a particular mobile device may be streaming video from domain 610 while performing a payment transaction with domain 610. Based on the techniques described above, packets associated with the streaming video may have a time delay inserted before transmission, and packets associated with the payment transaction may be transmitted without an inserted time delay.

Figure 7:
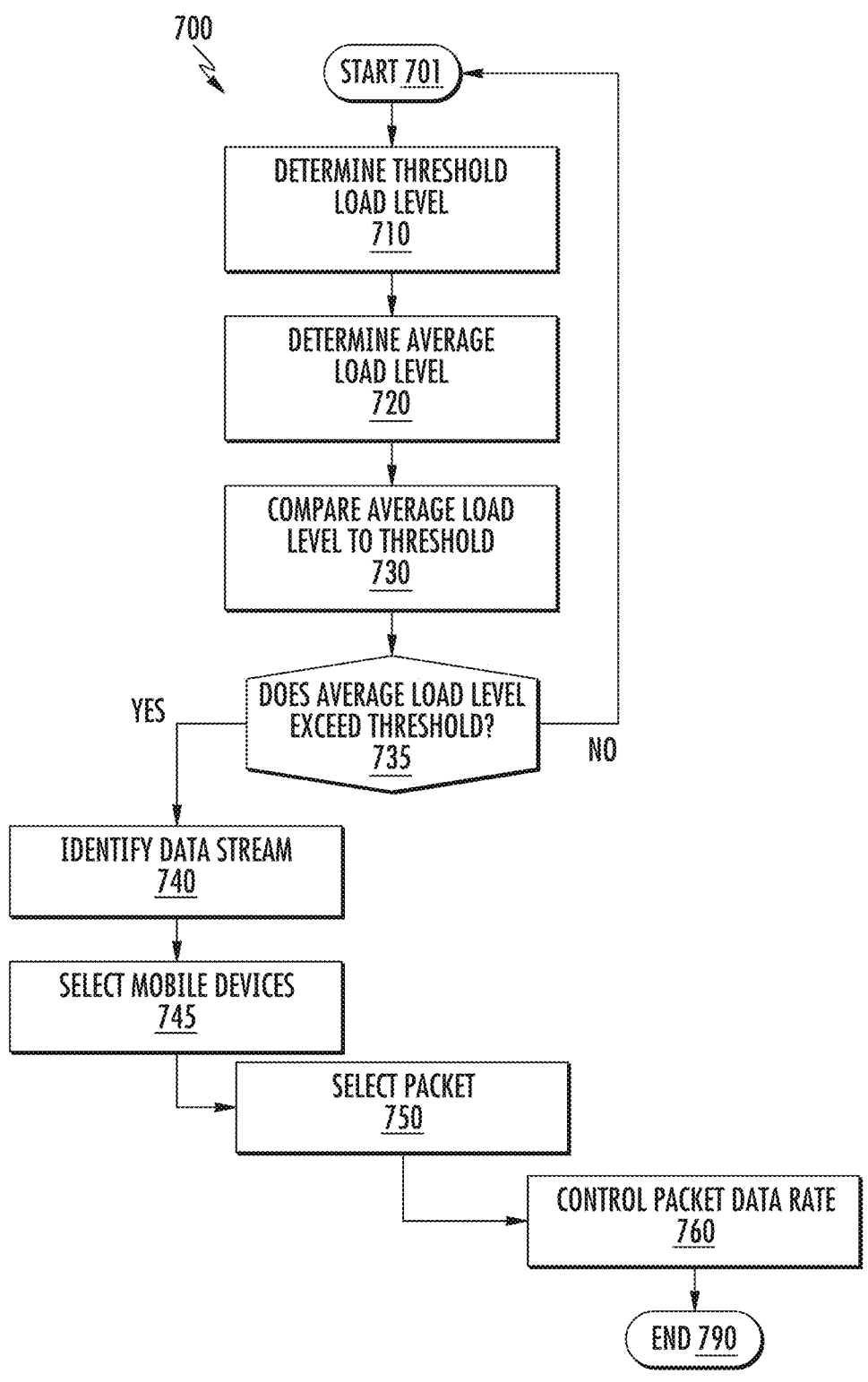
FIG. 7 is a flow chart depicting an example of a process for determining whether to control a data rate associated with a radio access node.

FIG. 7 is a flow chart depicting an example of a process for determining whether to control a data rate associated with a radio access node. In some implementations, operations related to FIG. 7 may be performed by a computing device, such as a processor associated with network management center 170 or network gateway 165. The computing device may be in communication with a radio access node, such as radio 150. For illustrative purposes, the process 700 is described with regards to the examples depicted in FIGS. 1-6.

At starting point 701 of FIG. 7, the radio access node may be carrying data traffic. The radio may carry the data traffic without controlling a data rate, or the radio may control a data rate for a portion of the data traffic. The radio may provide information regarding the carried data traffic.

At block 710, a threshold level for the radio may be determined. The threshold level may be determined based on one or more of the radios technical specifications, theoretical capacity, effective capacity, performance, or any other suitable factor.

At block 720, an average load level for the radio may be determined. The average load level may be determined based on a volume of traffic carried by the radio during a period of time, or information indicating previous volumes of traffic, or both.

At block 730, the average load level may be compared to the threshold level for the radio. For example, a network management center or a network gateway may compare the respective values of the average load level and the threshold to determine which value is greater. In some cases, the comparison indicates a margin (e.g., a difference in quantity) by which the average load level differs from the threshold level.

At block 735, a determination may be made regarding whether the average load level of the radio exceeds the threshold. If the average load level does not exceed the threshold, the process 700 may return to the starting point 701. If the average load level exceeds the threshold for the radio, the process 700 may continue to block 740.

At block 740, some or all of the data carried by the radio may be identified as one or more data streams available for data rate control. For example, a data stream may be identified based on an association with one or more domains having a history of high-volume data transactions. In addition, the data stream may be identified based on an association with a mobile device having a history of high-volume data transactions with the domains. In addition, the data stream may be identified based on a data type having an association with high-volume data transactions with the domains.

At block 745, one or more mobile devices associated with the data stream may be selected. The mobile devices may be selected based on their having an active communication session with the domains. In addition, the mobile devices may be selected based on their having a history of high-volume data transactions with the domains. In some cases, the mobile devices, including a quantity of the mobile devices, may be determined based on a margin by which the average load level differs from the threshold, as described with regards to block 730.

At block 750, one or more packets associated with the data stream may be selected. The packets may be selected based on a data type having an association with high-volume data transactions. For example, a selected packet may have a data type of a video media type. In addition, a selected packet may have a data type associated with a request for a high-volume data transaction, such as a video download.

At block 760, the one or more packets associated with the data stream may have a data rate controlled. For example, a time delay may be inserted prior to delivery of each packet. Based on the control of the data rate, the delivery of the one or more packets may be delayed.

The process 700 may end at ending point 790, or the process 700 may return to a different point, such as starting point 701. In some cases, operations related to process 700 may be determined based on additional iterations of process 700. For example, a first iteration of process 700 may provide a set of packets having time delays, such as to control a data rate at block 760. A second iteration of process 700 may determine that the average load level does not exceed the threshold level, such as at block 735. Responsive to determining that the average load level does not exceed the threshold, the provided set of packets may be transmitted without the time delays.

Figure 8:
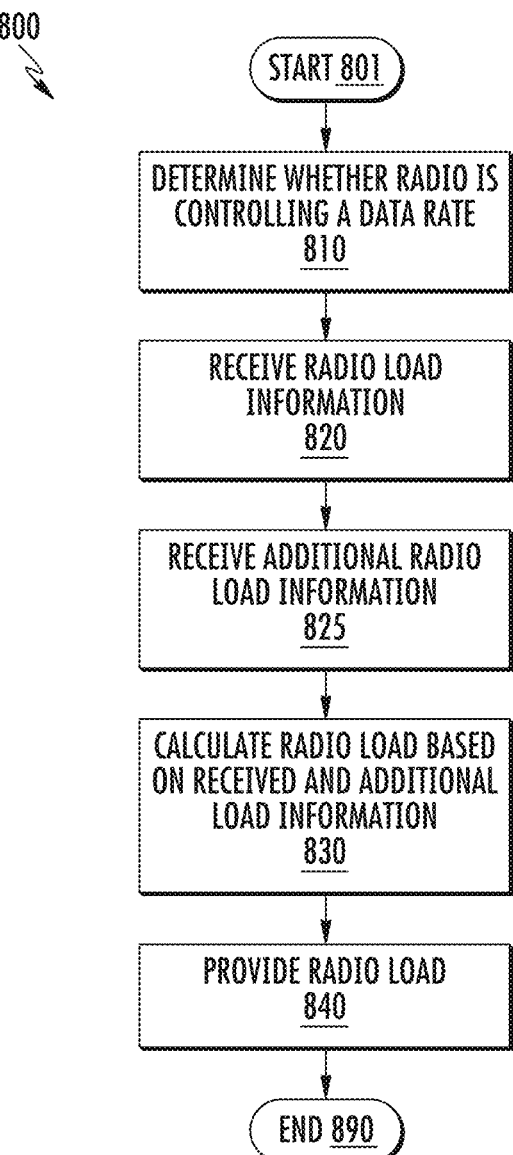
FIG. 8 is a flow chart depicting an example of a process for determining a load of a radio.

FIG. 8 is a flow chart depicting an example of a process for determining a load of a radio. A load may be determined during a period of time when the radio is not controlling a data rate, such as to provide historical information regarding the average load of the radio. Alternatively, a load may be determined when the radio is controlling a data rate, such as to determine whether the radio is still overburdened and additional data rates should be controlled. Operations related to FIG. 8 may be performed by a computing device, such as a processor associated with network management center 170 or network gateway 165. The computing device may be in communication with a radio access node, such as radio 150. For illustrative purposes, the process 800 is described with regards to the examples depicted in FIGS. 1-7. Other implementations, however, are possible.

At starting point 801 of FIG. 8, the radio access node may be capable of carrying data. The radio may provide information regarding the data traffic.

At block 810, a determination may be made whether the radio is controlling a data rate. The radio may be carrying the data traffic without controlling a data rate. Alternatively, the radio may not be carrying any data traffic at the time. In some cases, operations related to block 810 may include instructing the radio to not control a data rate for a period of time and storing an indication of the time period.

At block 820, information about the radio's data traffic load may be received, such as by a network management center or network gateway. The received information may be the load information for the current time. The received information may be stored, as described at least in regards to FIG. 1. In some cases, operations related to block 820 and/or block 810 are repeated. For example, operations related to block 820 may be repeated for the duration of a time period, such as the time period described in regards to block 810. During the time period, the information about the load may be stored, such as described at least in regards to FIG. 2.

At block 825, additional information about the radio's data traffic may be received. The additional information may be the load information for a recent period of time, such as the time period described in regards to block 810.

At block 830, a load may be determined for the radio based on the received information and the additional information. For example, a rolling average may be determined based on the time period described in regards to block 810. The load may be stored, as described at least in regards to FIG. 2.

At block 840, the load may be provided, such as to the network management center or network gateway. The load may be compared to other loads. For example, the load may be compared to loads determined for previous time periods, as described at least in regards to FIG. 2. In addition, the load may be compared to a threshold for the radio, as described at least in regards to FIG. 3.

The process 800 may end at ending point 890, or the process 800 may return to a different point, such as starting point 801. In some cases, ending point 890 may include additional operations, such as removing instructions to not control a data rate as described in regards to block 810.

Different decisions regarding operations of the radio may be based on the radio load provided by process 800. For example, if the operations related to block 810 determine that the radio is not controlling a data rate, or if the radio is instructed to not control a data rate, the load provided by operations related to block 840 may be used to determine an average load of the radio. This can provide historical data that accurately indicates whether the radio is typically overburdened, such as at a certain time of day. If the radio is controlling a data rate, the provided load may be used to determine a current load of the radio. This can provide current data that accurately indicates whether the radio is overburdened at the present time. In response, the radio may receive instructions to control additional data rates. In some implementations, operations related to process 800 may be performed for other types of traffic. For example, a load may be determined for voice services provided by the radio.

Figure 9:
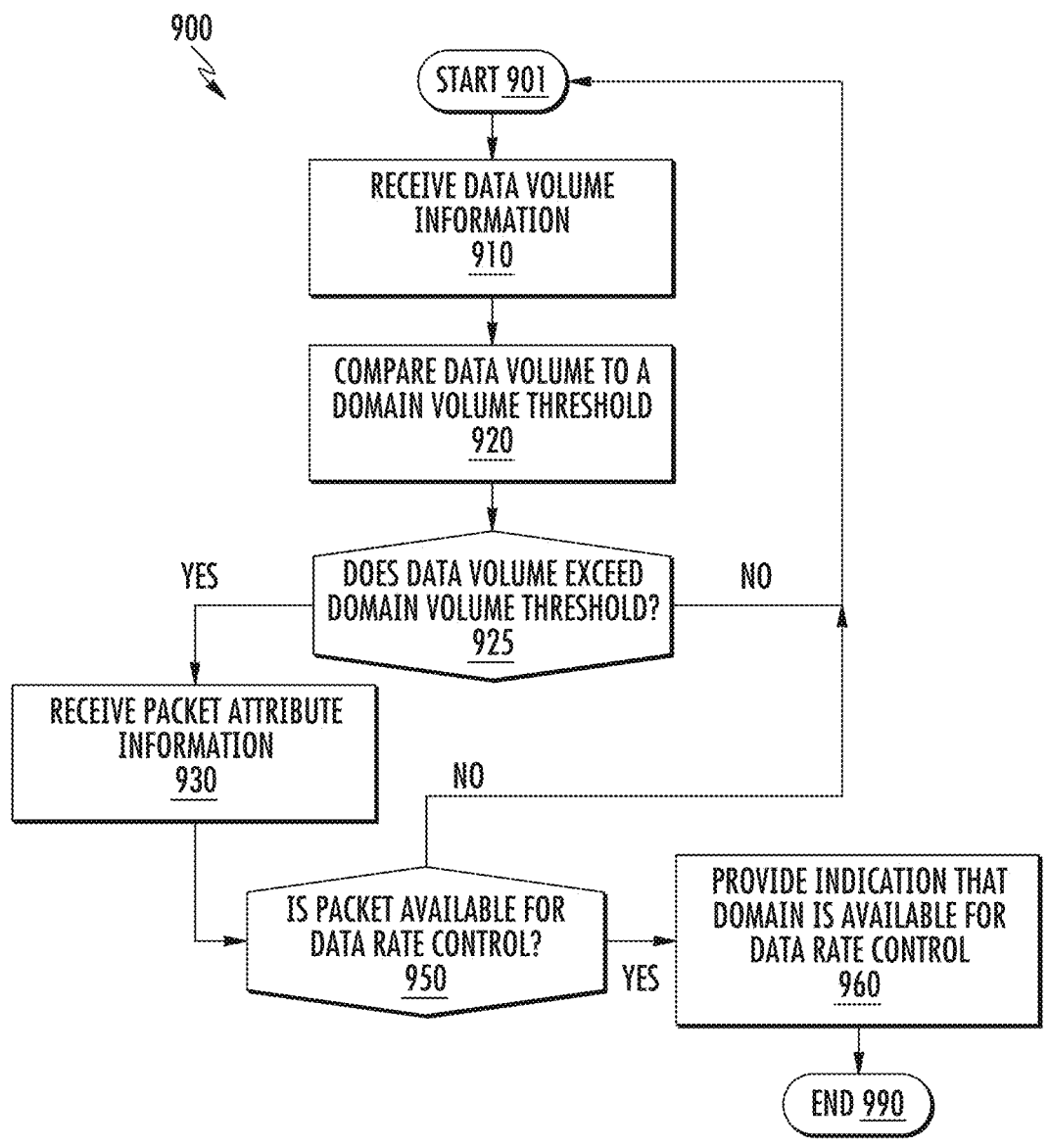
FIG. 9 is a flow chart depicting an example of a process for determining whether a data rate associated with a domain may be controlled.

FIG. 9 is a flow chart depicting an example of a process for determining whether a data rate associated with a domain may be controlled. The determination may be based on historical volumes or attributes of data associated with the domain. In some implementations, operations related to FIG. 9 may be performed by a computing device, such as a processor associated with network management center 170. The computing device may be in communication with one or more network gateways, such as network gateway 165, or a domain, such as a domain 140. The gateway may be in communication with one or more radio access nodes, such as radio 150. For illustrative purposes, the process 900 is described with regards to the examples depicted in FIGS. 1-8. Other implementations, however, are possible.

At starting point 901 of FIG. 9, the gateway may be capable of transmitting data to and from the domain. The transmitted data may include packets received from (or provided to) the domain, as described at least in regards to FIGS. 5 and 6. The gateway may provide information regarding the transmitted data. In addition, the radio may provide information regarding the transmitted data.

At block 910, information indicating a volume of the transmitted data may be received. The information may indicate a time period in which the data was transmitted (e.g., volume of data in a day, volume of data in an hour). In some implementations, the volume may be associated with the domain. The volume may be based on packets included in the transmitted data. In some cases, the volume is calculated based on attributes of the packets. For example, the volume may be calculated based on a quantity of packets received during a time period and a respective size attribute of each of the packets.

The volume information may be received from a particular network gateway and/or a particular radio access node. In addition, the volume information may be received from multiple gateways and/or multiple radios. The volume information may be aggregated across the gateway(s) or radio(s) from which the information is received (e.g., calculating a total volume carried by multiple gateways/radios). In addition, the volume information may be associated with the particular gateway or radio from which the information is received (e.g., calculating a particular volume carried by a particular gateway/radio).

At block 920, the received volume information may be compared to a volume threshold. The volume threshold may be associated with the domain. For example, if volume information is received from each domain in a group of domains, each of the domains in the group may have a respective volume threshold.

At block 925, a determination may be made regarding whether the data volume received from the domain exceeds the volume threshold associated with that domain. If the received data volume does not exceed the volume threshold, the process 900 may return to the starting point 901. If the received volume exceeds the volume threshold for the domain, the process 900 may continue to block 930. In some cases, the volume threshold may be associated with a time period (e.g., a threshold of data transmitted in an hour).

At block 930, information identifying attributes of each of the transmitted packets may be received, such as a data type or a timestamp. In some cases, a portion of the volume of transmitted data is associated with an identified data type. For example, a first data stream of the transmitted data may include packets having a video data type. A second data stream may include packets having a timestamp within a certain time period (e.g., 3:00 PM-6:00 PM). In addition, multiple attributes may be identified for a packet (or group of packets). For example, packets having a video media data type may have an additional attribute indicating an adjustable bit rate for the video media.

In some cases, identified portions of the transmitted data may be associated with an additional volume. For example, if the transmitted data for the domain comprises a first data stream having a text data type and a second data stream having a video data type, the first and second data streams may each have an additional volume determined, based on the quantity and size of packets in each respective stream. The additional volume may be determined as a number (e.g., a data stream with a volume of 25 Mb per hour), as a percentage (e.g., a data stream representing 60% of the domain's volume), or as any other suitable metric.

At block 950, a determination may be made indicating whether a data rate may be controlled for a transmitted packet. The determination may be made based on one or more of a volume, data type, or other attribute associated with the packet. For example, a packet having a video data type and an additional attribute indicating an adjustable bit rate may be determined to be available for data rate control. In addition, a packet having a video data type and lacking an adjustable bit rate attribute may be determined to be unavailable for data rate control. If the transmitted packet is not available for data rate control, the process 900 may return to a different point, such as starting point 901. If the transmitted packet is available for data rate control, the process 900 may continue to block 960.

At block 960, an indication that the domain is available for data rate control may be provided. The indication may be received by one or more of the network management center or the network gateway. In addition, the indication may be used to determine that a domain has a history of high-volume data transaction. The indication may indicate that data rates for data having particular attributes are available for control. For example, data rates for packets having a video media type and a timestamp within a certain range (e.g., 3:00 PM-6:00 PM) may be indicated as available for control.

The process 900 may end at ending point 990, or the process 900 may return to a different point, such as starting point 901. Operations related to process 900 may be performed in an order different from as depicted in FIG. 9. For example, operations related to block 930 may be performed concurrently with operations related to block 910. Other implementations are also possible.

In some implementations, operations related to process 900 may be performed for other transmitted data. For example, the process 900 may be performed regarding transmitted data associated with a mobile device. The transmitted data may include packets received from (or provided to) the mobile device. In addition, an indication that the mobile device is available for data rate control may be provided.

Figure 10:
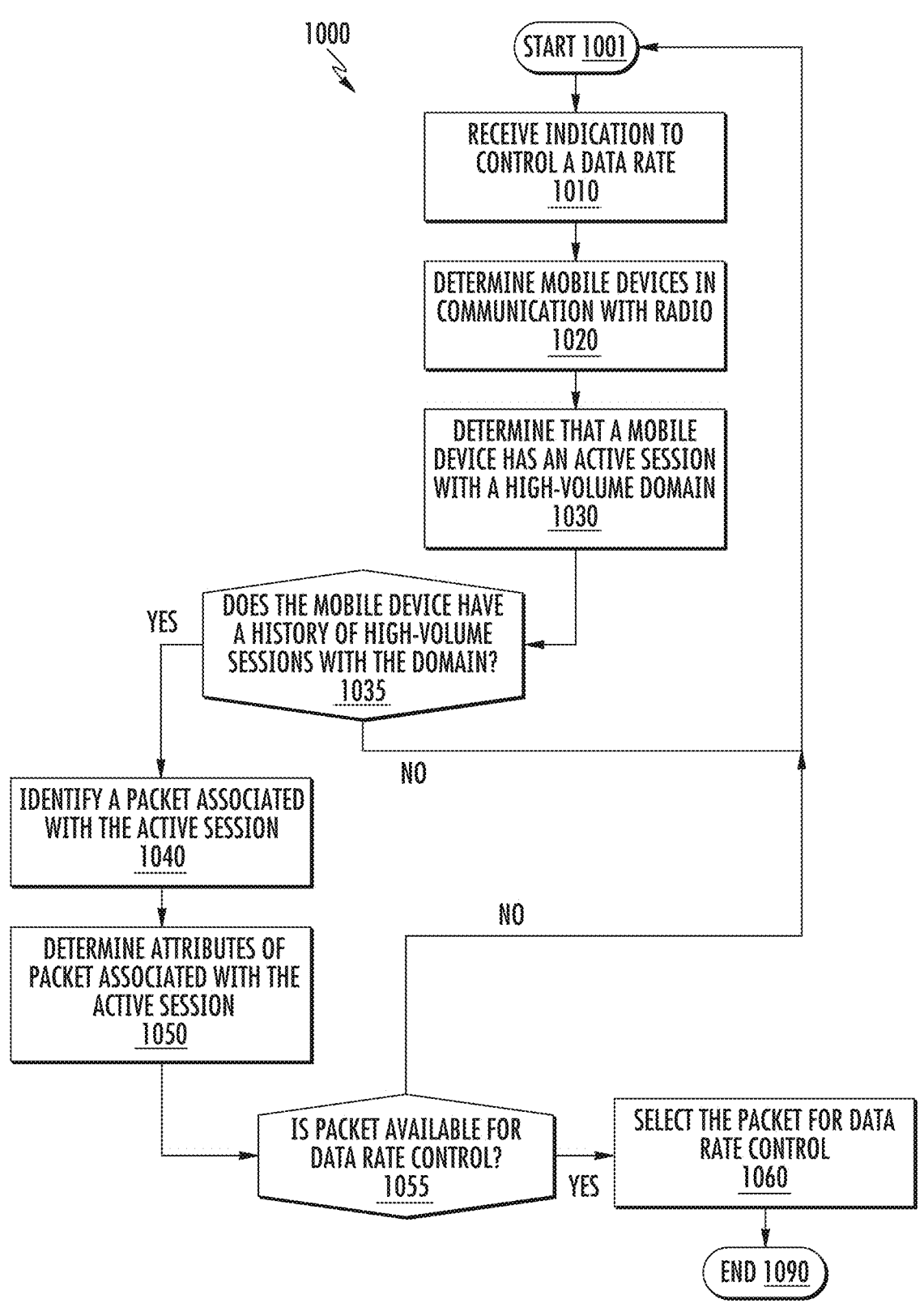
FIG. 10 is a flow chart depicting an example of a process for selecting packets that may have a controlled data rate.

FIG. 10 is a flow chart depicting an example of a process for selecting packets that may have a controlled data rate. In some implementations, operations related to FIG. 10 may be performed by a computing device, such as a processor associated with network management center 170 or network gateway 165. The computing device may be in communication with a radio access node, such as radio 150, or a domain, such as a domain 140. For illustrative purposes, the process 1000 is described with regards to the examples depicted in FIGS. 1-9. Other implementations, however, are possible.

At starting point 1001 of FIG. 10, the radio access node may be carrying data traffic. The radio may carry the data traffic without controlling a data rate. Alternatively, at least a portion of the carried traffic may have a controlled data rate. The radio may provide information regarding the data traffic.

At block 1010, an indication to control a data rate associated with the radio may be received. For example, the network gateway may receive an instruction to delay a delivery of packets associated with the radio, as described at least in regards to FIGS. 5 and 6.

At block 1020, a set of one or more mobile devices in communication with the radio may be determined. In one implementation, the determined set includes mobile devices that transmit data via (or with) the radio. In some cases, the set may be determined based on a comparison of an average load of the radio to a threshold of the radio, as described at least in regards to FIGS. 2 and 3. For example, a quantity or attributes of mobile devices included in the set may be determined based on comparing the average load to the threshold.

At block 1030, a determination may be made that a particular mobile device in the group has an active data session with a domain having a history of high-bandwidth data transactions. The active data session may comprise transmission of data packets to and from the mobile device and the domain, via the radio and/or the network gateway. The determination may be based on one or more attributes of the mobile device (e.g., an identification number, an IP address), the active session (e.g., a packet destination address), or both.

At block 1035, a determination may be made regarding whether the particular mobile device has a history of high-volume data sessions with the domain. The determination may be based on stored information associated with the mobile device and/or the domain, as described at least in regards to FIG. 9. If the mobile device does not have a history of high-volume data sessions with the domain, the process 1000 may return to the starting point 1001, or to block 1020, or to any other suitable point in process 1000. If the mobile device has a history of high-volume data sessions with the domain, the process 1000 may continue to block 1040.

At block 1040, one or more packets associated with the active session may be identified. The identified packets may be associated with the particular mobile device and with the domain having a history of high-bandwidth data transactions. The identification may be based on packet attributes (e.g., source or destination addresses).

At block 1050, one or more attributes for an identified packet may be determined. Determined attributes may include a data type, a size, a timestamp, or any other suitable attribute. In addition, multiple attributes may be determined for the packet. For example, packets having a video media data type may have an additional attribute indicating an adjustable bit rate for the video media.

At block 1055, a determination may be made regarding whether the identified packet is available for data rate control. The determination may be based on the attributes identified for the packet. For example, a determination may be made that a packet having a video data type and an additional attribute indicating an adjustable bit rate is available for data rate control. If the packet is not available for data rate control, the process 1000 may return to the starting point 1001, or to block 1040, or to any other suitable point in process 1000. If the packet is available for data rate control, process 1000 may continue to block 1060.

At block 1060, the packet may be selected for data rate control. Information regarding the selection may be received by one or more of the network management center or the network gateway. The selection may include inserting a time delay prior to delivery of the packet, as described at least in regards to FIGS. 5 and 6.

Operations related to one or more of blocks 1040, 1050, 1055, or 1060 may be repeated for each of the packets associated with the active session.

The process 1000 may end at ending point 1090, or the process 1000 may return to a different point, such as starting point 1001. In some cases, operations related to process 1000 may be determined based on additional iterations of process 1000. For example, a first iteration of process 1000 may select a packet for data rate control, such as at block 1060. A second iteration of process 1000 may receive an indication to stop controlling a data rate, such as at block 1010. Responsive to receiving the indication to stop controlling the data rate, the selection of the packet may be removed.

The implementations described herein are examples, and the features of different implementations may be combined to achieve many different techniques, without departing from the described invention. For all of the provided examples and figures, the values and ranges are exemplary only, and may be changed without departing from the scope of the invention. The depicted and described services, attributes, and values are exemplary, and different characteristics may be used without departing from the described invention.

The foregoing descriptions and examples are provided for purposes of illustrating, explaining, and describing aspects of the present invention. Further modifications and adaptations to these examples will be apparent to those skilled in the art and may be made without departing from the scope of the invention. The exemplary systems and methods represented here may be implemented independently, in conjunction with a different one of the systems described, or in conjunction with a system not described herein. In some implementations, one or more of the techniques described herein may be performed on a mobile device based on an agreement, by a user of the device, to allow performance of the technique (e.g., "opt-in" agreement). The agreement may be requested based on regulatory requirements in the user's region.

What is claimed is:

1. A method, comprising:
   determining, by a system comprising a processor, that a mobile device has an active session with a domain;
   determining, by the system, that the mobile device has a history of a volume of sessions with the domain exceeding a threshold;
   identifying, by the system and based on the determining that the mobile device has the history of the volume of sessions with the domain exceeding the threshold, a packet associated with the active session;
   determining, by the system, that the packet is available for data rate control in accordance with at least one attribute of the packet;
   selecting, by the system, the packet for the data rate control based on the determining that the packet is available for data rate control;
   determining, by the system and based on the selecting, a length of a time delay based on a margin by which an average load level of a radio exceeds a threshold level, a delay due to a loss of service, and a delay due to a security check; and
   delaying, by the system, a transmission of the packet by the length of the time delay.

2. The method of claim 1, wherein the at least one attribute comprises each of: a data type, a size, and a timestamp.

3. The method of claim 1, further comprising:
   determining, by the system, that the mobile device has a history of low-bandwidth transactions with the domain according to a low bandwidth criterion; and
   based on the determining that the mobile device has the history of low-bandwidth transactions with the domain according to the low bandwidth criterion, transmitting, by the system, a second packet without a delay.

4. The method of claim 1, wherein the packet is included as part of a first data stream, the method further comprising:
   identifying, by the system, a second data stream between the domain and a second mobile device;
   determining, by the system, that the second mobile device has a history of low-bandwidth transactions with the domain according to a low bandwidth transaction criterion; and
   responsive to the determining that the second mobile device has the history of low-bandwidth transactions with the domain, transmitting, by the system, a second packet that is included in the second data stream without a delay.

5. The method of claim 1, further comprising:
   in response to determining that a second packet has a data type associated with high-bandwidth data transactions according to a high bandwidth transaction criterion, including, by the system, a delay when transmitting the second packet; and
   in response to determining that the second packet has a data type associated with low-bandwidth data transactions according to a low bandwidth transaction criterion, transmitting, by the system, the second packet without the delay, wherein the high-bandwidth data transactions and satisfying the high bandwidth transaction criterion are associated with bandwidths greater than those of the low-bandwidth data transactions and satisfying the low bandwidth transaction criterion.

6. The method of claim 1, wherein the packet is included as part of a first data stream, the method further comprising:

identifying, by the system, a second data stream between the mobile device and a second domain, wherein the second domain is a low-bandwidth domain satisfying a low bandwidth domain criterion; and transmitting, by the system and based on the identifying of the second data stream, a second packet included in the second data stream without a delay.

7. The method of claim 1, wherein the system is included as part of a network management center or a network gateway.

8. The method of claim 1, wherein the packet is a packet of video media.

9. The method of claim 8, wherein the at least one attribute indicates an adjustable bit rate for the video media.

10. A system comprising:

at least one processor; and a memory that stores executable instructions that, when executed by the at least one processor, facilitate a performance of operations, the operations comprising:

determining that a mobile device has an active session with a domain;

determining that the mobile device has a history of a volume of sessions with the domain exceeding a threshold;

identifying, based on the determining that the mobile device has the history of the volume of sessions with the domain exceeding the threshold, a packet associated with the active session;

determining that the packet is available for data rate control;

selecting the packet for the data rate control based on the determining that the packet is available for data rate control;

determining, based on the selecting, a length of a time delay based on a margin by which an average load level of a radio exceeds a threshold level, a delay due to a loss of service, and a delay due to a security check;

delaying a transmission of the packet by the length of the time delay; and transmitting the packet based on the delaying.

11. The system of claim 10, wherein the determining that the packet is available for the data rate control is based on at least one attribute of the packet.

12. The system of claim 11, wherein the at least one attribute comprises a source address of the packet.

13. The system of claim 11, wherein the at least one attribute comprises a destination address of the packet.

14. The system of claim 11, wherein the at least one attribute comprises a data type, a size, a timestamp, or any combination thereof.

15. A non-transitory machine-readable medium comprising executable instructions that, when executed by at least one processor, facilitate a performance of operations, the operations comprising:

determining that a mobile device has an active session with a domain;

determining that the mobile device has a history of a volume of sessions with the domain exceeding a threshold;

identifying, based on the determining that the mobile device has the history of the volume of sessions with the domain exceeding the threshold, a packet associated with the active session;

selecting, based on the identifying, the packet for data rate control;

determining, based on the selecting, a length of a time delay based on a margin by which an average load level of a radio exceeds a threshold level, a delay due to a loss of service, and a delay due to a security check;

delaying a transmission of the packet by the length of the time delay; and transmitting the packet based on the delaying.

16. The non-transitory machine-readable medium of claim 15, wherein the operations further comprise:

determining that the packet is available for the data rate control, wherein the selecting is based on the determining that the packet is available for the data rate control.

17. The non-transitory machine-readable medium of claim 16, wherein the operations further comprise:

receiving packet attribute information associated with the packet, the packet attribute information pertaining to a plurality of attributes, wherein the determining that the packet is available for the data rate control is based on the receiving of the packet attribute information.

18. The non-transitory machine-readable medium of claim 17, wherein the plurality of attributes comprises a source address of the packet and a destination address of the packet.

* * * * *